United States Patent [19]
Fujii et al.

[11] Patent Number: 6,018,361
[45] Date of Patent: Jan. 25, 2000

[54] APPARATUS FOR AND METHOD OF MEASURING IMAGE QUALITIES OF COLOR DISPLAY UNIT

[75] Inventors: Masaru Fujii, Kanagawa; Satoshi Takemoto, Tokyo; Tokio Takeuchi, Chiba, all of Japan

[73] Assignee: Sony Corporation, Tokyo, Japan

[21] Appl. No.: 08/858,179

[22] Filed: May 19, 1997

[30] Foreign Application Priority Data

May 23, 1996 [JP] Japan ..................................... 8-128587

[51] Int. Cl.$^7$ .......................... H04N 17/00; H04N 17/04
[52] U.S. Cl. .......................... 348/180; 348/180; 348/189; 348/190; 348/807
[58] Field of Search ..................................... 348/180, 189, 348/190, 191, 657, 658, 806, 807, 223, 227; 345/150, 207; H04N 17/00, 17/04

[56] References Cited

U.S. PATENT DOCUMENTS

| | | | |
|---|---|---|---|
| 4,814,858 | 3/1989 | Mochizuki et al. | 348/191 |
| 4,963,828 | 10/1990 | Kawame et al. | 348/180 |
| 5,028,849 | 7/1991 | Kawakami et al. | 315/368 |
| 5,032,769 | 7/1991 | Kawakami | 315/368 |
| 5,036,251 | 7/1991 | Lee | 348/180 |
| 5,319,459 | 6/1994 | Mochizuki et al. | 348/189 |
| 5,442,391 | 8/1995 | Hung et al. | 348/190 |
| 5,473,394 | 12/1995 | Hideyuki | 348/190 |
| 5,532,764 | 7/1996 | Itaki | 348/807 |
| 5,612,738 | 3/1997 | Kim | 348/223 |
| 5,638,461 | 6/1997 | Fridge | 348/190 |

FOREIGN PATENT DOCUMENTS 2255700A 11/1992 United Kingdom .................. 17/4

Primary Examiner—John K. Peng
Assistant Examiner—Paulos Natnael
Attorney, Agent, or Firm—Frommer Lawrence & Haug, LLP; William S. Frommer

[57] ABSTRACT

An apparatus for measuring image qualities of a color display unit has an image quality sensor comprising a color video camera for imaging a display screen of the color display unit and a fixed-focus lens combined as an imaging lens with the color video camera. Image qualities of the color display unit are measured based on an image signal generated by the color video camera, and an image signal required to measure the image qualities is generated and supplied to the color display unit.

8 Claims, 8 Drawing Sheets

APPARATUS FOR AND METHOD OF MEASURING IMAGE QUALITIES OF COLOR DISPLAY UNIT

BACKGROUND OF THE INVENTION

1. Field of the Invention

The present invention relates to an apparatus for and a method of measuring the image qualities of a color display unit such as a color television receiver, a television color cathode-ray tube, a display monitor (a color cathode-ray tube as a computer display monitor), a projection display unit, or the like.

2. Description of the Prior Art

Color display units such as color television receivers, television color cathode-ray tubes, display monitors (color cathode-ray tubes as computer display monitors), projection display units, etc. are subject to image quality factors including geometric raster distortions (image distortions), misconvergence (color shifts), color purity, color temperature, etc.

Image quality sensors for measuring image qualities may comprise photodiodes or one or more video cameras. Different image quality sensors may be switched over to measure different image quality factors.

Recently, there has been a demand for image quality measuring apparatus which have an image quality sensor comprising a single color video camera for measuring various image quality factors with high accuracy. Such image quality measuring apparatus should be easy to use, inexpensive to manufacture, and available in small quantities for a number of different design types.

One image quality measuring apparatus which meets the above demand employs a color video camera as an image quality sensor combined with a zoom lens. The color video camera captures the qualities of an entire image displayed on a color display unit being measured, and the image quality measuring apparatus measures image distortions, color shifts, and color purity among other image qualities.

Another image quality measuring apparatus which meets the above demand employs a monochromatic video camera as an image quality sensor combined with a fixed-focus lens. The monochromatic video camera captures the qualities of an entire image displayed on a color display unit being measured, and the image quality measuring apparatus measures image distortions among other image qualities.

However, the image quality measuring apparatus which employs a color video camera as an image quality sensor is disadvantageous in that since the primary optical filters in the color video camera have broad wavelength characteristics, crosstalk occurs between primary color signals, resulting in a reduction in the accuracy of color shift measurement. Since the amount of crosstalk varies depending on the wavelength of the three primaries radiated from the measured color display unit, if the crosstalk is to be canceled out, then it is necessary to take into account the emission characteristics of the color display unit, and the calibration process is tedious and time-consuming.

When the image quality measuring apparatus which employs a color video camera as an image quality sensor is used to measure image distortions, it is also necessary to determine which one of the primary color signals from the camera is to be used.

With the image quality measuring apparatus in which the color video camera is combined with a zoom lens, it is easy to match the field of view obtained by the camera to the dimensions of the measured color display unit. However, because the focal length of the zoom lens is not fixed, when image distortions are to be measured which require the position and dimensions of a displayed image to be measured, corrective calculations for calculating the absolute values of the dimensions are difficult to carry out, and as a result the accuracy of measurement of image distortions is lowered.

The image quality measuring apparatus in which the monochromatic video camera is combined with a fixed-focus lens offers merits for the measurement of image distortions, but needs to follow the process, given below, for measuring color shifts. Images displayed on the color display unit being measured are switched over for respective primary colors, and the positions of the respective primary color images are measured. The differences between the measured positions of the respective primary color images are then detected as color shifts. While the above process is being carried out to switch displayed images from one primary color to a next primary color and the position of the next primary color image is being measured, if the displayed primary color image suffers jitter or the image quality sensor or the color display unit being measured is mechanically vibrated for some reason, then the accuracy of measurement of the color shifts is reduced.

SUMMARY OF THE INVENTION

It is therefore an object of the present invention to provide an apparatus for and a method of measuring the image qualities of a color display unit by measuring many image quality factors of the color display unit highly accurately with a minimum amount of image quality sensor hardware.

According to the present invention, there is provided an apparatus for measuring image qualities of a color display unit, comprising an image quality sensor comprising a color video camera for imaging a display screen of the color display unit and a fixed-focus lens combined as an imaging lens with the color video camera, image quality measuring means for measuring image qualities of the color display unit based on an image signal generated by the color video camera, and image signal generating means for generating an image signal required to measure the image qualities and supplying the image signal to the color display unit.

With the above arrangement, an image signal required to measure the image qualities is generated by the image signal generating means and supplied to the color display unit for displaying an image required to measure the image qualities on the display screen of the color display unit. The image displayed on the display screen is then imaged by the color video camera, and the image qualities are measured by the image quality measuring means based on an image signal generated by the color video camera. The apparatus is capable of measuring the image qualities of the color display unit, e.g., many image quality factors (geometric raster distortions, misconvergence, color purity, etc.) of the color display unit, with high accuracy using a minimum amount of image quality sensor hardware.

The apparatus further comprises color temperature measuring means for measuring a color temperature of the display screen of the color display unit. The apparatus is thus also capable of measuring a color temperature of the color display unit and adjusting a white balance of the color display unit.

The color display unit either comprises a color cathode-ray tube or includes a color cathode-ray tube, and the apparatus further comprises magnetic field generating means for imparting an external magnetic field to electron beams in the color cathode-ray tube. The apparatus is also capable of measuring color purity of the color display unit.

The magnetic field generating means comprises a coil and staircase signal generating means for supplying a staircase current to the coil. The apparatus is capable of measuring color purity of the color display unit highly efficiently.

The image quality measuring means comprises means for measuring geometric raster distortions of the color display unit with a green signal generated by the color video camera. Because the human visual sensitivity is highest with respect to the color of green among the three primaries, the color video camera can measure geometric raster distortions as accurately as a monochromatic video camera.

The apparatus further comprises canceling means for canceling crosstalk components from three-primary signals generated by the color video camera, the image quality measuring means comprises means for measuring misconvergence of the color display unit after the crosstalk components are canceled from the three-primary signals by the canceling means. The apparatus is capable of easily and reliably measuring misconvergence.

According to the present invention, there is also provided a method of measuring image qualities of a color display unit, comprising the steps of supplying an image signal required to measure the image qualities of the color display unit, imaging a display screen of the color display unit with a color video camera of an image quality sensor which has a fixed-focus lens combined as an imaging lens with the color video camera, and measuring image qualities of the color display unit based on an image signal generated by the color video camera. The method is capable of measuring the image qualities of the color display unit, e.g., many image quality factors (geometric raster distortions, misconvergence, color purity, etc.) of the color display unit, with high accuracy using a minimum amount of image quality sensor hardware.

The method further comprises the step of measuring a color temperature of the display screen of the color display unit with color temperature measuring means. The method is thus also capable of measuring a color temperature of the color display unit and adjusting a white balance of the color display unit.

The color display unit either comprises a color cathode-ray tube or includes a color cathode-ray tube, further comprising the step of imparting an external magnetic field to electron beams in the color cathode-ray tube to move the electron beams. The method is also capable of measuring color purity of the color display unit.

The method further comprises the step of passing a staircase current to a coil to generate the external magnetic field. The method is capable of measuring color purity of the color display unit highly efficiently.

The method further comprises the step of measuring geometric raster distortions of the color display unit with a green signal generated by the color video camera. Because the human visual sensitivity is highest with respect to the color of green among the three primaries, the color video camera can measure geometric raster distortions as accurately as a monochromatic video camera.

The method further comprises the steps of canceling crosstalk components from three-primary signals generated by the color video camera, and measuring misconvergence of the color display unit after the crosstalk components are canceled from the three-primary signals by the canceling means. The method is capable of easily and reliably measuring misconvergence.

DETAILED DESCRIPTION OF THE PREFERRED EMBODIMENTS

Figure 1:
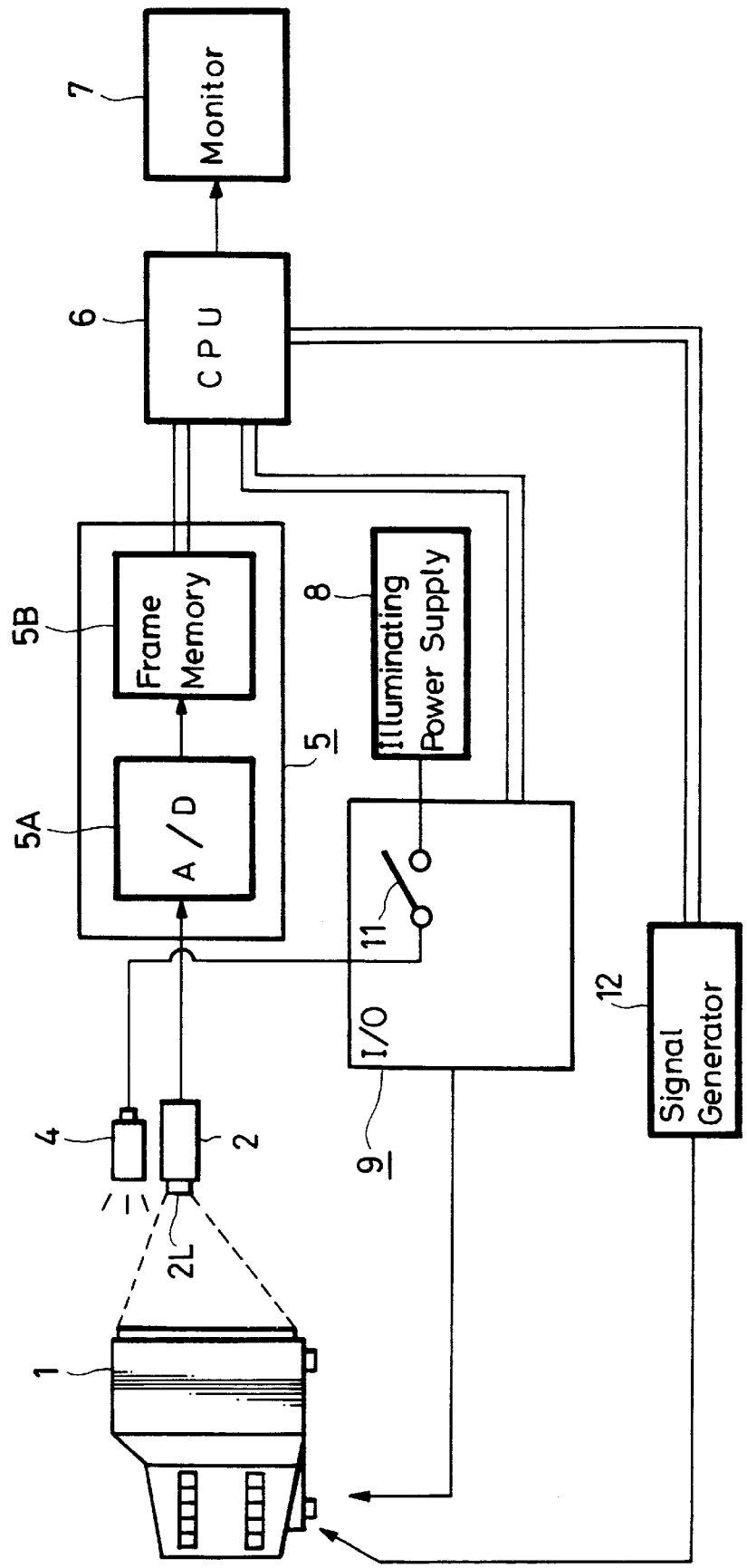
FIG. 1 is a block diagram of an apparatus for measuring the image qualities of a color display unit according to an embodiment of the present invention.

An apparatus for measuring the image qualities of a color display unit according to an embodiment of the present invention will be described below with reference to FIG. 1. In FIG. 1, the color display unit, denoted by 1, whose image qualities are to be measured by the apparatus comprises a color television receiver which has a color cathode-ray tube. However, the color display unit 1 may comprise a television color cathode-ray tube, a display monitor (a color cathode-ray tube as a computer display monitor), a projection display unit, or the like.

The apparatus has a color video camera 2 for imaging the entire display screen of the color display unit 1 and a fixed-focus lens 2L used as an imaging lens of the color video camera 2. The color video camera 2 and the fixed-focus lens 2L jointly serve as an image quality sensor (color image quality sensor).

The apparatus also includes an illuminating light source 4 which is energized only when a reference position for measuring image distortions of images displayed by the color display unit 1 is to be illuminated. The illuminating light source 4 is positioned in the vicinity of the color display unit 1, and electrically connected to an illuminating power supply 8 through an on/off switch 11 in an input/output interface circuit 9.

An image processing circuit 5 has an A/D converter 5A for converting an image signal from the color video camera 2 into a digital image signal, and a frame memory 5B for storing the digital image signal from the A/D converter 5A. If a digital image signal is directly generated by the color video camera 2, then the A/D converter 5A of the image processing circuit 5 may be dispensed with. The digital image signal (digital image data) read from the frame memory 5B is transferred through a bus line (two thin wires) to a memory (not shown) in a CPU (central processing unit) as a computer, the CPU having a ROM which stores a program and a RAM for storing processed data.

A monitor 7, which comprises a monochromatic cathode-ray tube, a liquid-crystal display panel, a plasma display panel, or the like, is connected to the CPU 6.

The CPU 6 controls a signal generator 12 through a bus line for generating an image signal such as a pattern signal which is necessary for measurement. The generated image signal is supplied to the color display unit 1 for displaying a pattern image necessary for measurement on the display screen of the color cathode-ray tube.

For example, if image distortions (geometric raster distortions) of an image are to be measured, then the CPU 6 calculates the position of the image from the image data, and displays calculated positional data as graphic data or numerical data on the display screen of the monitor 7 on a real-time basis. The CPU 6 may store the calculated positional data in an external memory such as a hard disk (not shown) or transmit the calculated positional data through a network to a host computer for analytical processing or the like.

The input/output interface circuit 9, which is connected to the CPU 6, is used to control measurement start and end signals that are used in the measurement of image qualities on a display unit production line, or to generate serial control signals that are used in the automatic adjustment of the image qualities of the color display unit 1.

Circuits for automatic image quality adjustments in the input/output interface circuit 9 and a process of effecting such automatic image quality adjustments will be described below with reference to FIG. 5. Those parts in FIG. 5 which are identical to those shown in FIG. 1 are denoted by identical reference numerals. For effecting automatic image quality adjustments on the color display unit 1, the CPU 6 communicates with the color display unit 1 through a serial input/output circuit 16 in the input/output interface circuit 9, forming an automatic adjustment loop. If serial signals for automatic adjustments are in conformity with the RS-232C standards, then the color display unit 1 may be connected directly to a serial terminal 6t of the CPU 6 for communications. Serial signals for automatic adjustments may be transmitted between the CPU 6 and the color display unit 1 by way of fiber optics or infrared radiation through an optoelectric/electrooptic transducer 16.

An operation sequence of the apparatus shown in FIG. 1 will be described with reference to FIG. 6.

Figure 6:
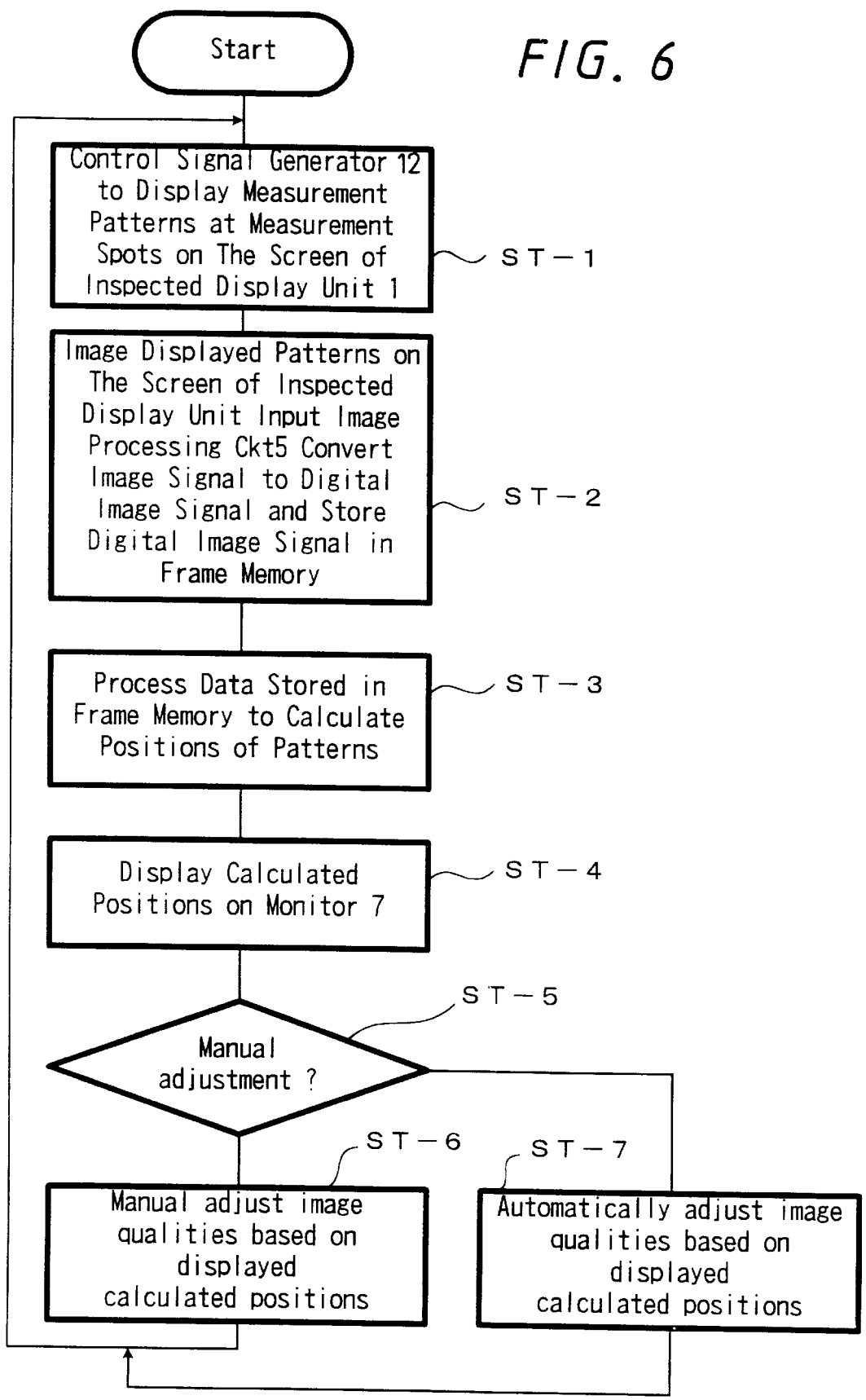
FIG. 6 is a flowchart of an operation sequence of the apparatus shown in FIG. 1.

As shown in FIG. 6, the CPU 6 controls the signal generator 12 to display measurement patterns at measurement spots on the display screen of the color display unit 1 in a step ST-1. Then, in a step ST-2, the measurement patterns displayed on the display screen of the color display unit 1 are imaged in its entirety by the color video camera 2, and an image signal generated by the color video camera 2 is supplied to the image processing circuit 5. In the image processing circuit 5, the image signal is converted into a digital image signal by the A/D converter 5A. The digital image signal is stored in the frame memory 5B.

In a next step ST-3, the CPU 6 processes the digital image data stored in the frame memory 5B to calculate the positions of the respective patterns. In a step ST-4, the CPU 6 displays the calculated positions on the monitor 7. Then, the CPU 6 determines in a step ST-5 whether manual adjustments are to be made or not. If manual adjustments are to be made (YES) in the step ST-5, then the operator manually adjusts an image quality adjustment knob of the color display unit 1 based on the calculated positions displayed on the monitor 7 in a step ST-6. If automatic adjustments are to be made (NO) in the step ST-5, then the CPU 6 controls the color display unit 1 to automatically adjust the image qualities of the color display unit 1 depending on the calculated positions displayed on the monitor 7 in a step ST-7.

It is assumed that color shifts (misconvergence) among the image quality factors are measured by the apparatus shown in FIG. 1. In the measurement of color shifts, each of primary color signals generated by the color video camera 2 are subject to crosstalk components created by the other primary color signals. A process of canceling out such crosstalk components will be described below.

(a) The CPU 6 controls the signal generator 12 to display an image on the display screen of the color display unit 1, the image being white at a predetermined color temperature. Then, the CPU 6 controls the signal generator 12 to generate a green pattern signal, which is supplied to the color display unit 1 to display a green pattern on the display screen thereof. The displayed green pattern is then imaged by the color video camera 2, and an image signal generated by the color video camera 2 is stored in the memory of the CPU 6.

(b) Based on the displayed green pattern image, the CPU 6 stores in its memory the data of a pattern image of a crosstalk component Xg-r introduced into a red signal generated by the color video camera 2 and the data of a pattern image of a crosstalk component Xg-b introduced into a blue signal generated by the color video camera 2.

(c) Then, the CPU 6 controls the signal generator 12 to generate a red pattern signal, which is supplied to the color display unit 1 to display a red pattern on the display screen thereof. The displayed red pattern is then imaged by the color video camera 2, and an image signal generated by the color video camera 2 is stored in the memory of the CPU 6.

(d) Based on the displayed red pattern image, the CPU 6 stores in its memory the data of a pattern image of a crosstalk component Xr-g introduced into a green signal generated by the color video camera 2 and the data of a pattern image of a crosstalk component Xr-b introduced into a blue signal generated by the color video camera 2.

(e) Then, the CPU 6 controls the signal generator 12 to generate a blue pattern signal, which is supplied to the color display unit 1 to display a blue pattern on the display screen thereof. The displayed blue pattern is then imaged by the color video camera 2, and an image signal generated by the color video camera 2 is stored in the memory of the CPU 6.

(f) Based on the displayed blue pattern image, the CPU 6 stores in its memory the data of a pattern image of a crosstalk component Xb-g introduced into a green signal generated by the color video camera 2 and the data of a pattern image of a crosstalk component Xb-r introduced into a red signal generated by the color video camera 2.

(g) The crosstalk components have thus been measured in the steps (a)–(f). For actually measuring color shifts, the CPU 6 runs a software program to automatically eliminate the crosstalk components based on the crosstalk component data stored in the memory of the CPU 6.

Figure 7A:
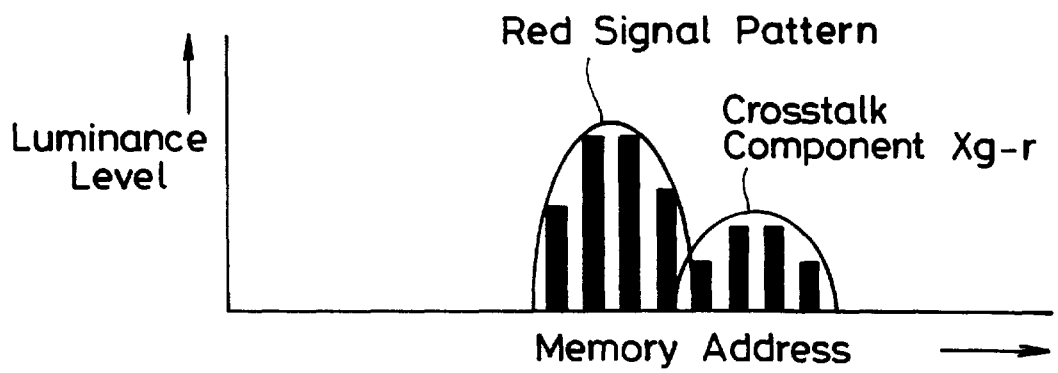
FIGS. 7A through 7C are diagrams illustrative of a process of canceling out crosstalk.
Figure 7B:
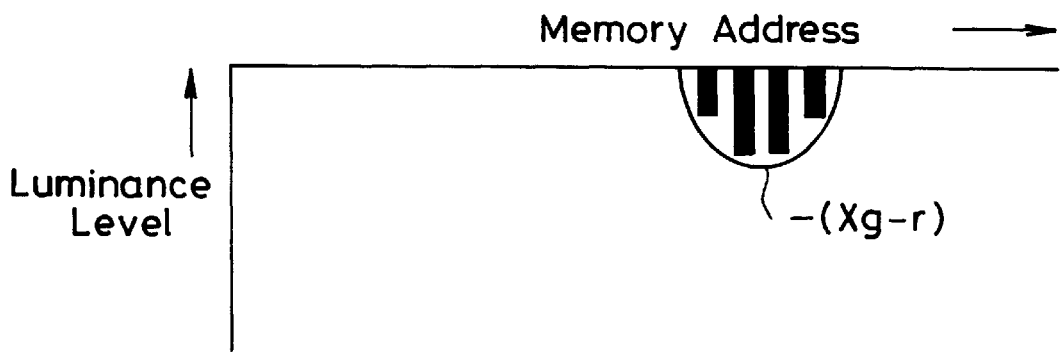
Figure 7C:
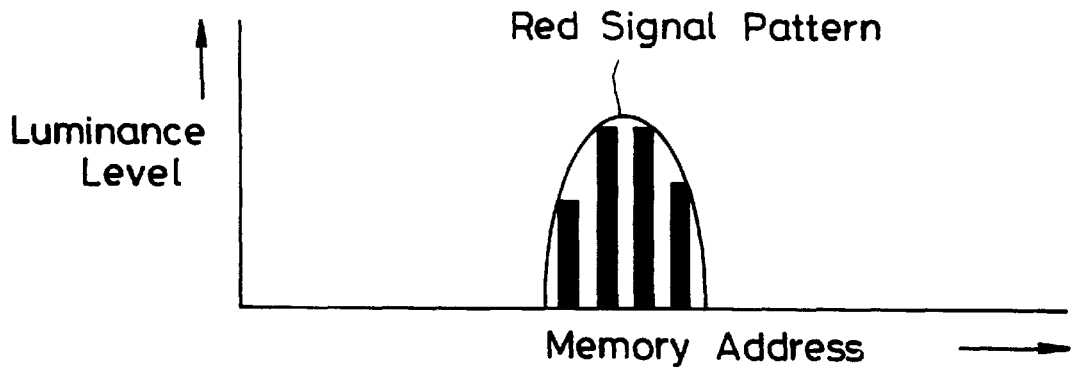

The principles of a process of canceling out the crosstalk components will be described below with reference to FIGS. 7A through 7C. In the graphs shown in FIGS. 7A through 7C, the horizontal axis represents addresses of the memory of the CPU 6, and the vertical axis represents the luminance level of the image data. The data of a stroke component—(Xg-r) (see FIG. 7B), which is opposite in polarity to the stroke component Xg-r (see FIG. 7A) introduced into the red signal generated by the color video camera 2 and stored in the memory of the CPU 6, is produced and stored in the memory of the CPU 6. Then, the data of the stroke component Xg-r (see FIG. 7A) and the data of the stroke component—(Xg-r) (see FIG. 7B) are read from the memory, and added to each other, thereby producing the data of the red signal which is free of the stroke component (Xg-r) as shown in FIG. 7C. The data of the red signal thus produced is stored in the memory of the CPU 6.

Then, the manner in which crosstalk is produced between primary color signals generated by the color video camera 2 and how the crosstalk is canceled out will be described below with reference to FIGS. 8A through 8C. In the graphs shown in FIGS. 8A through 8c, the horizontal axis represents addresses (image positions) of the memory of the CPU 6, and the vertical axis represents the luminance level of the image data.

Figure 8A:
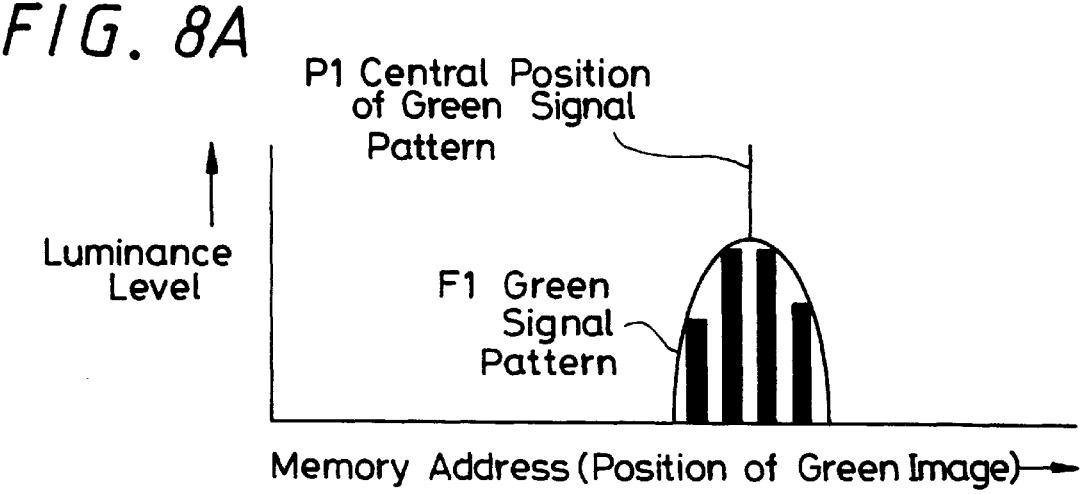
FIGS. 8A through 8C are diagrams illustrative of the manner in which crosstalk is produced between primary color signals generated by a color video camera of the apparatus shown in FIG. 1 and how the crosstalk is canceled out.

FIG. 8A shows the image data of a green pattern which is displayed on the display screen of the color display unit 1, the image data being stored in the memory of the CPU 6. In FIG. 8A, the image data is expressed as a green signal pattern Fl, and has its position expressed as a central position P1 of the green signal pattern.

The CPU 6 controls the signal generator 12 to display a red pattern at a position slightly displaced from the position of the green pattern position. The red pattern is imaged by the color video camera 2, and the data of the red pattern is stored in the memory of the CPU 6. FIG. 8B shows the image data of the red pattern which is displayed on the display screen of the color display unit 1. In FIG. 8B, the image data is expressed as an overall red signal pattern including an intrinsic red signal pattern F2 and a crosstalk component F3 (Xg-r). The intrinsic red signal pattern F2 has a central position P2 and the overall red signal pattern has a central position P3. As can be seen from FIGS. 8A and 8B, the crosstalk component F3 (Xg-r) appears at the central position P1 of the green signal pattern. Because of the crosstalk component F3 (Xg-r), the central position P3 of the overall red signal pattern is shifted from the central position P3 of the intrinsic red signal pattern F2 toward the central position P1 of the green signal pattern. Such a positional shift is responsible for an error in the measurement of color shifts.

Since the level of the crosstalk component F3 (Xg-r) can be calculated from the luminance level of the green signal pattern F1 and the position of the crosstalk component F3 (Xg-r) is aligned with the position of the green signal pattern F1, the crosstalk component F3 (Xg-r) can easily be canceled out according to a software program run by the CPU 6.

Figure 8B:
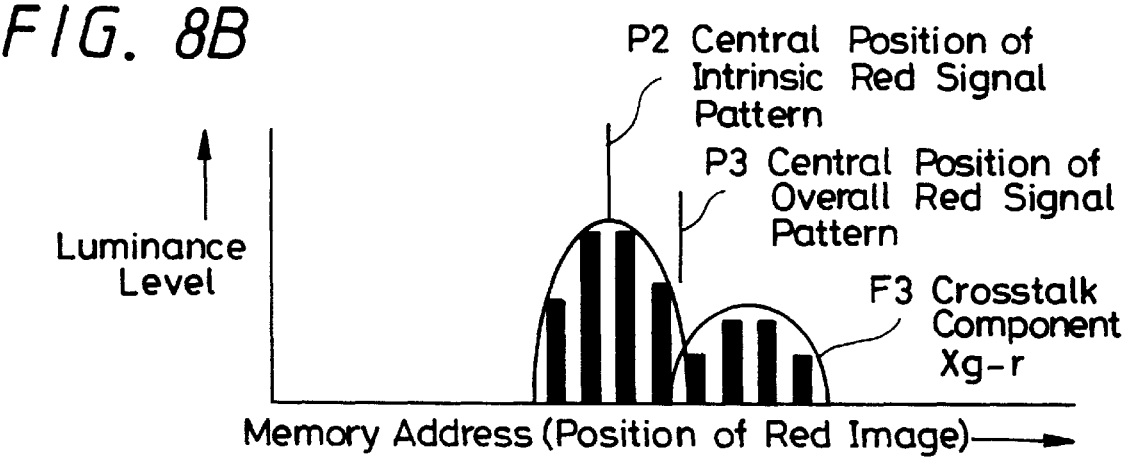
Figure 8C:
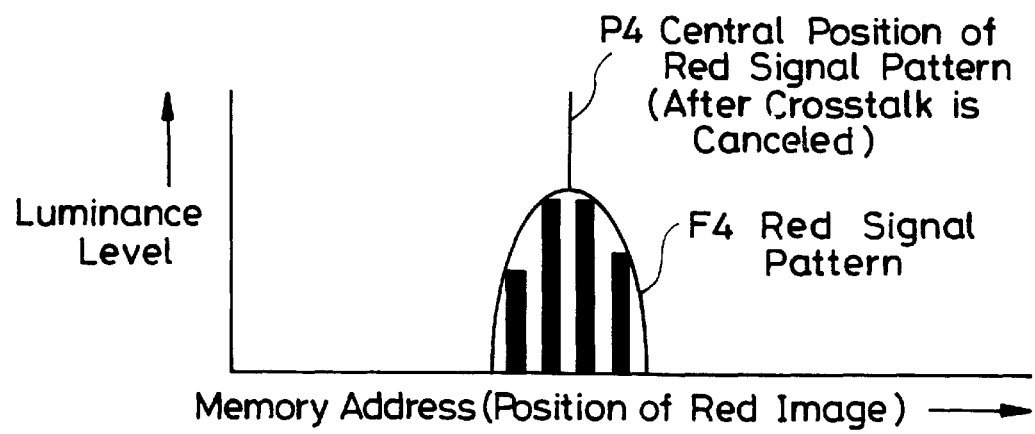

FIG. 8C shows a red signal pattern F4 which is free of the crosstalk component F3 (Xg-r) shown in FIG. 8B, the red signal pattern F4 having a central position P4. It can be seen from the central position P4 that the central position P4 is not affected by any crosstalk.

A process of measuring image distortions with the apparatus shown in FIG. 1 will be described below. The CPU 6 controls the signal generator 12 to display a raster on the full area of the display screen of the color display unit 1, and an edge position of the displayed raster is used as a reference position for the measurement of image distortions. In this case, the illuminating light source 4 is not required.

If the color display unit 1 comprises a display monitor (a color cathode-ray tube as a computer display monitor) and is set to an underscan mode, then the size of a raster displayed on the display screen in the underscan mode is smaller than the effective display screen of the color cathode-ray tube, and an edge position of the raster is not fixed and cannot be used as a reference position for the measurement of image distortions. In this case, an edge of the bezel of the cabinet of the display monitor, i.e., the color cathode-ray tube as a computer display monitor, needs to be used as a reference position for the measurement of image distortions. The illuminating light source 4 is energized to illuminate the display screen of the display monitor for allowing the edge of the bezel to be positionally measured with ease. The illuminating light source 4 is connected to the illuminating power supply 8 through the on/off switch 11 in the input/output interface circuit 9. The display monitor, i.e., the color cathode-ray tube as a computer display monitor, can be controlled to switch between an overscan mode and an underscan mode.

A procedure to be carried out before the measurement of image distortions of the color display unit 1 which comprises a display monitor will be described below. If the apparatus is used in combination with a production line of color display units, then the input/output interface circuit 9 shown in FIG. 5 is employed. In such an application, a signal indicative of whether the color display unit 1 to be measured has reached a position in front of the color video camera 2 or a control signal for moving the color display unit 1 after its image qualities have been adjusted needs to be transmitted between the apparatus and a conveyor control system of the production line. Such a signal or control signal is transmitted through a parallel input/output circuit 18 in the input/output interface circuit 9. The parallel input/output circuit 18 has the on/off switch 11.

(a) When the color display unit 1 to be measured has been moved by the conveyor of the production line and reached the position in front of the color video camera 2, the conveyor control system transmits a measurement start signal through the parallel input/output circuit 18 to the CPU 6.

(b) Then, before the color display unit 1 displays a raster, the CPU 6 controls the parallel input/output circuit 18 to turn on the on/off switch 11 to energize the illuminating light source 4.

(c) The illuminating light source 4 illuminates the display screen of the color display unit 1 for allowing the color video camera 2 to clearly image an edge of the bezel of the cabinet of the color display unit 1. The data of the imaged edge of the bezel is stored in the memory of the CPU 6 for subsequent calculations of reference position data for the measurement of image distortions.

(d) Thereafter, the CPU 6 controls the parallel input/output circuit 18 to turn off the on/off switch 11 to de-energize the illuminating light source 4. The CPU 6 then controls the signal generator 12 to display a measurement pattern on the display screen of the color display unit 1, and starts measuring image distortions.

In the measurement of image distortions, only a green signal produced by the color video camera 2 is used because the human visual sensitivity is highest with respect to the color of green among the three primaries, so that the color video camera 2 can provide the same measurement capability as a monochromatic video camera.

Details of a process of measuring color purity with the apparatus shown in FIG. 1 will be described later on with reference to FIG. 3.

An apparatus for measuring the image qualities of a color display unit according to another embodiment of the present invention will be described below with reference to FIG. 2. Those parts shown in FIG. 2 which are identical to those shown in FIG. 1 are denoted by identical reference numerals and representations, and will not be described below.

Figure 2:
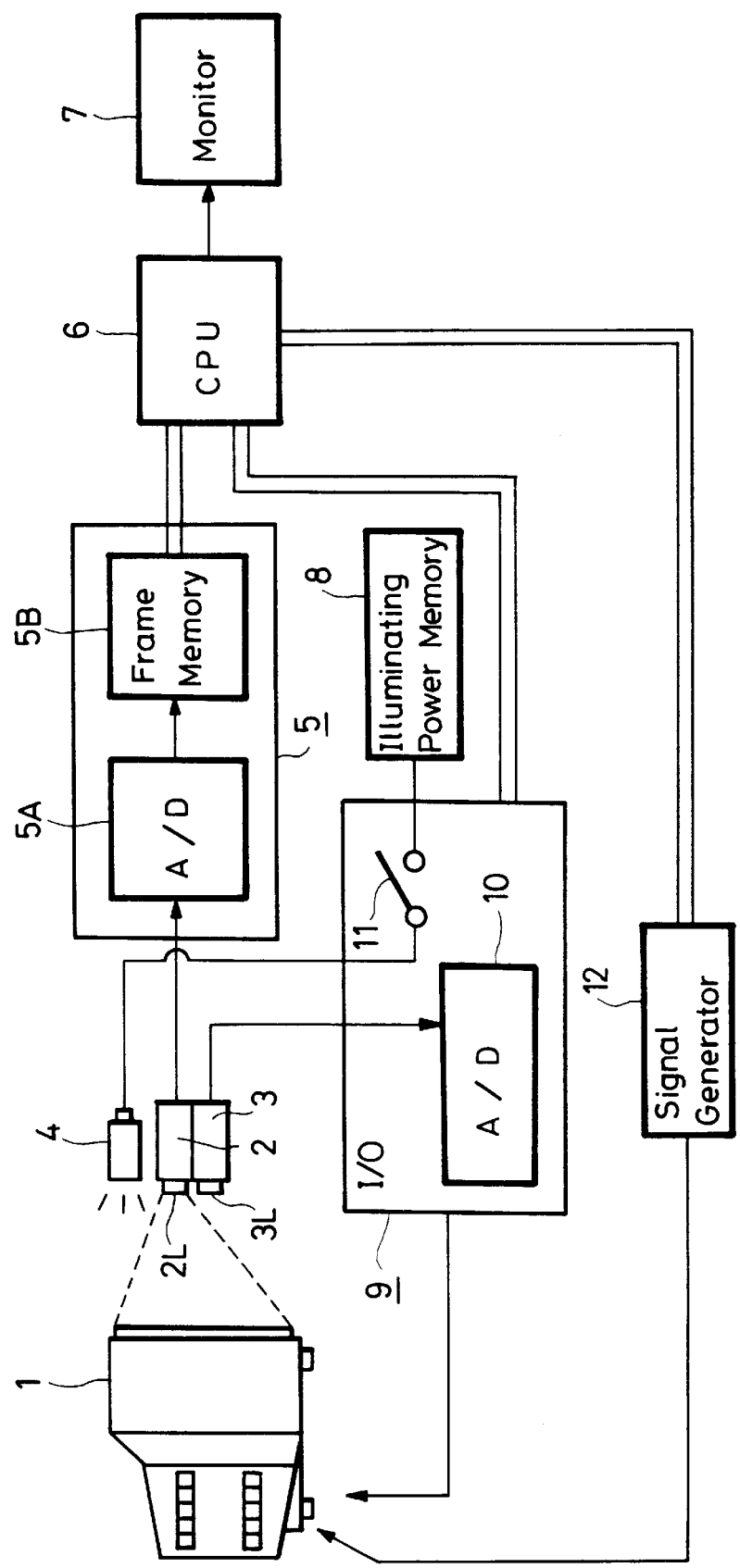
FIG. 2 is a block diagram of an apparatus for measuring the image qualities of a color display unit according to another embodiment of the present invention.

As shown in FIG. 2, the apparatus additionally includes a color sensor 3 for measuring a color temperature of the entire display screen of the color display unit 1 being measured. A lens 3L is mounted on a detector end of the color sensor 3. The CPU 6 controls the signal generator 12 to display a white image on the display screen of the color display unit 1. The white image displayed on the display screen is detected by the color sensor 3 and separated into three primaries by three primary filters of the color sensor 3. Three primary color signals produced by the color sensor 3 are supplied to an A/D converter 10 in the input/output interface circuit 9, which converts the three primary color signals into digital three primary color signals. The digital three primary color signals are then supplied through the bus line to the CPU 6 for allowing the CPU 6 to measure a color temperature of the color display unit 1 and adjust a white balance of the color display unit 1. If the color sensor 3 can directly generate digital three primary color signals, then the A/D converter 10 may be dispensed with.

The other details of the apparatus shown in FIG. 2 are the same as those of the apparatus shown in FIG. 1. Therefore, the apparatus shown in FIG. 2 is also capable of measuring geometric raster distortions and misconvergence.

An apparatus for measuring the image qualities of a color display unit according to still another embodiment of the present invention will be described below with reference to FIG. 3. Those parts shown in FIG. 3 which are identical to those shown in FIGS. 1 and 2 are denoted by identical reference numerals and representations, and will not be described below.

Figure 3:
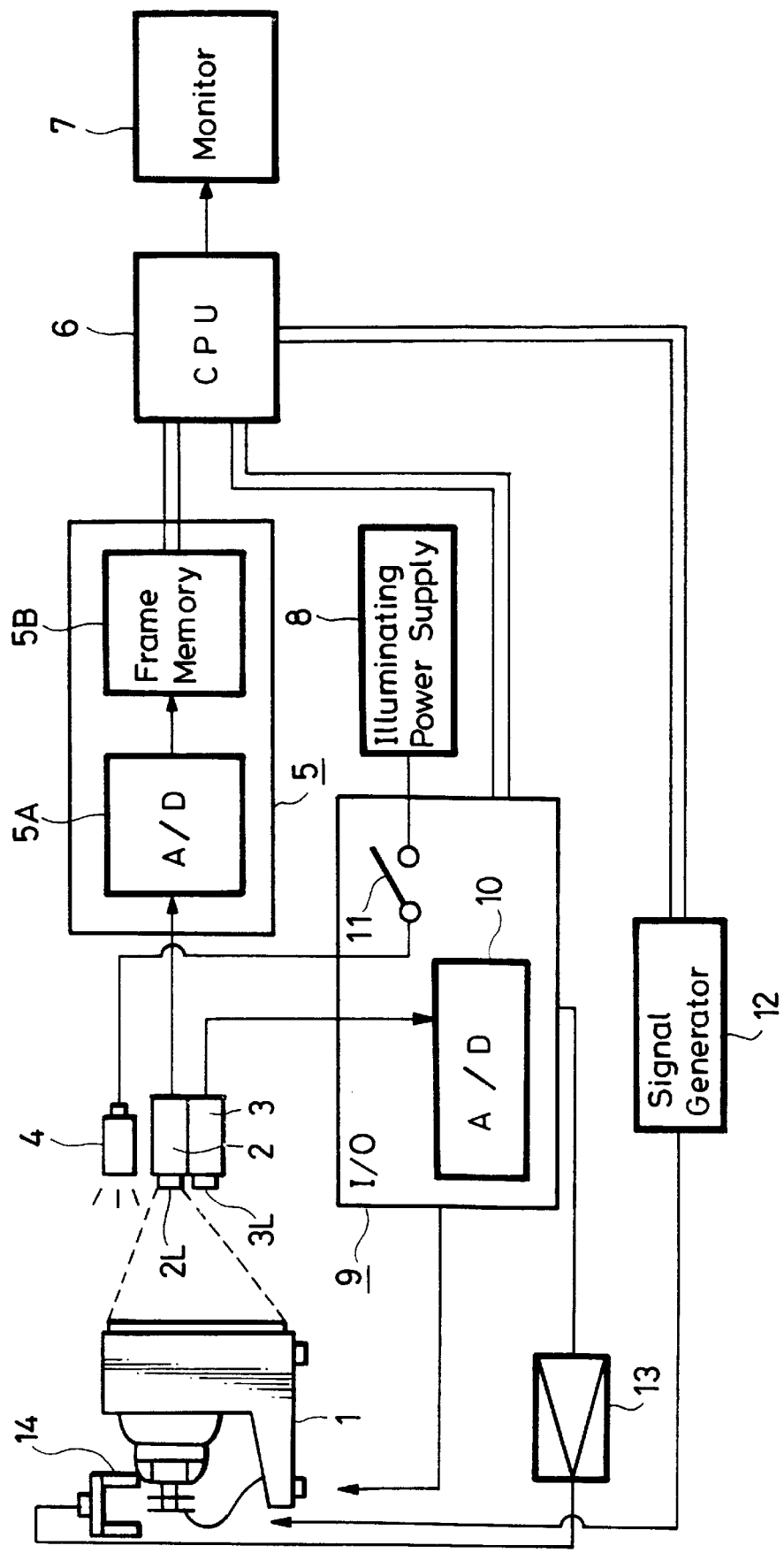
FIG. 3 is a block diagram of an apparatus for measuring the image qualities of a color display unit according to still another embodiment of the present invention.

As shown in FIG. 3, the apparatus additionally includes an external coil 14 for moving three-primary electron beams in the color cathode-ray tube of the color display unit 1 in lateral directions substantially perpendicular to the central one of the three-primary electron beams in a plane in which the three-primary electron beams lie, in order to measure color purity. The external coil 14 is mounted on the neck of the color cathode-ray tube of the color display unit 1. If the external coil 14 cannot be mounted on the neck of the color cathode-ray tube of the color display unit 1, then two external coils 14A, 14B may be positioned above and below, respectively, the neck of the color cathode-ray tube as shown in FIG. 4.

Figure 4:
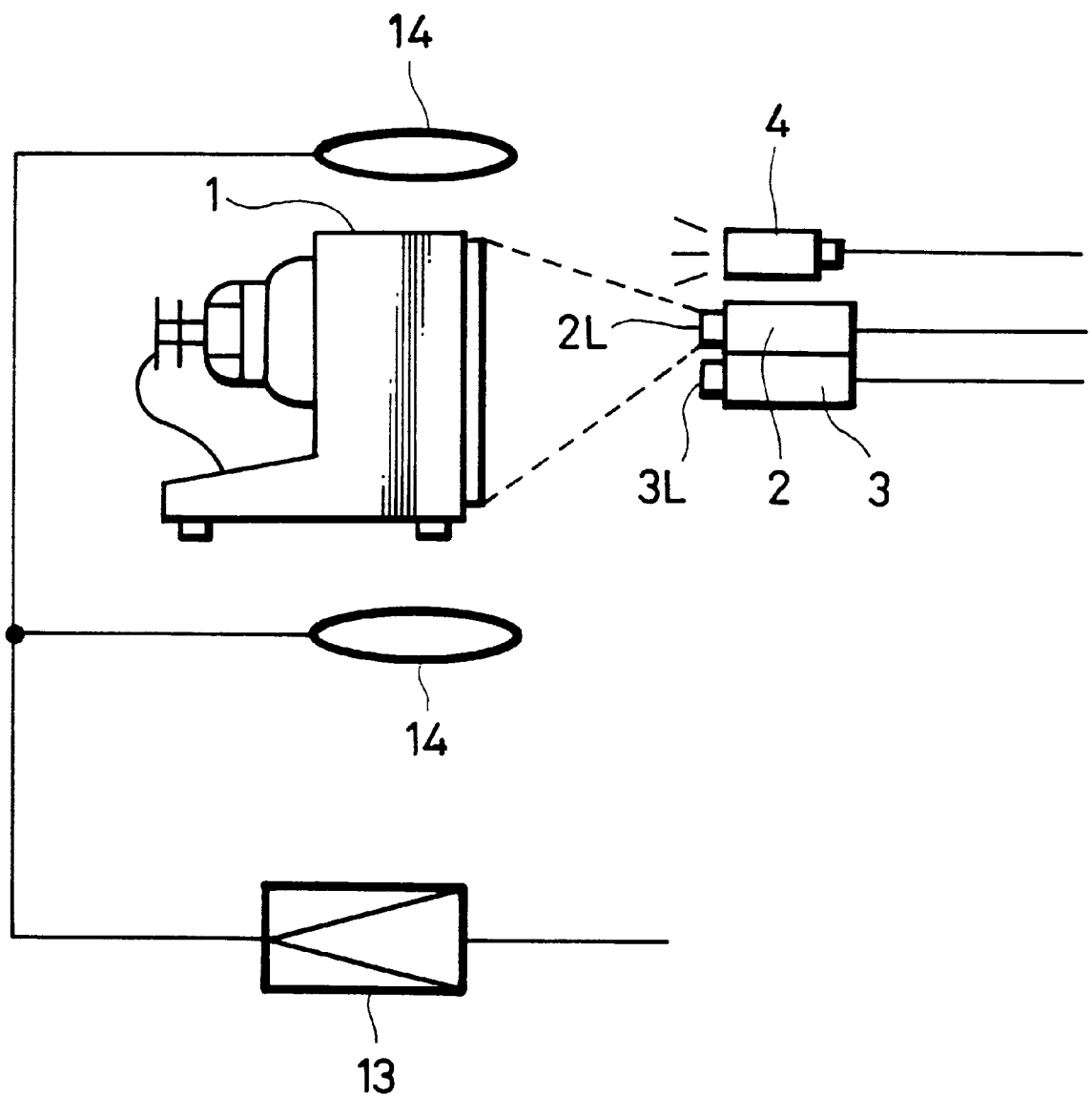
FIG. 4 is a view showing a modification of the apparatus shown in FIG. 3.

In FIGS. 3 and 4, the neck of the color cathode-ray tube of the color display unit 1 is shown exposed to external view.

Figure 5:
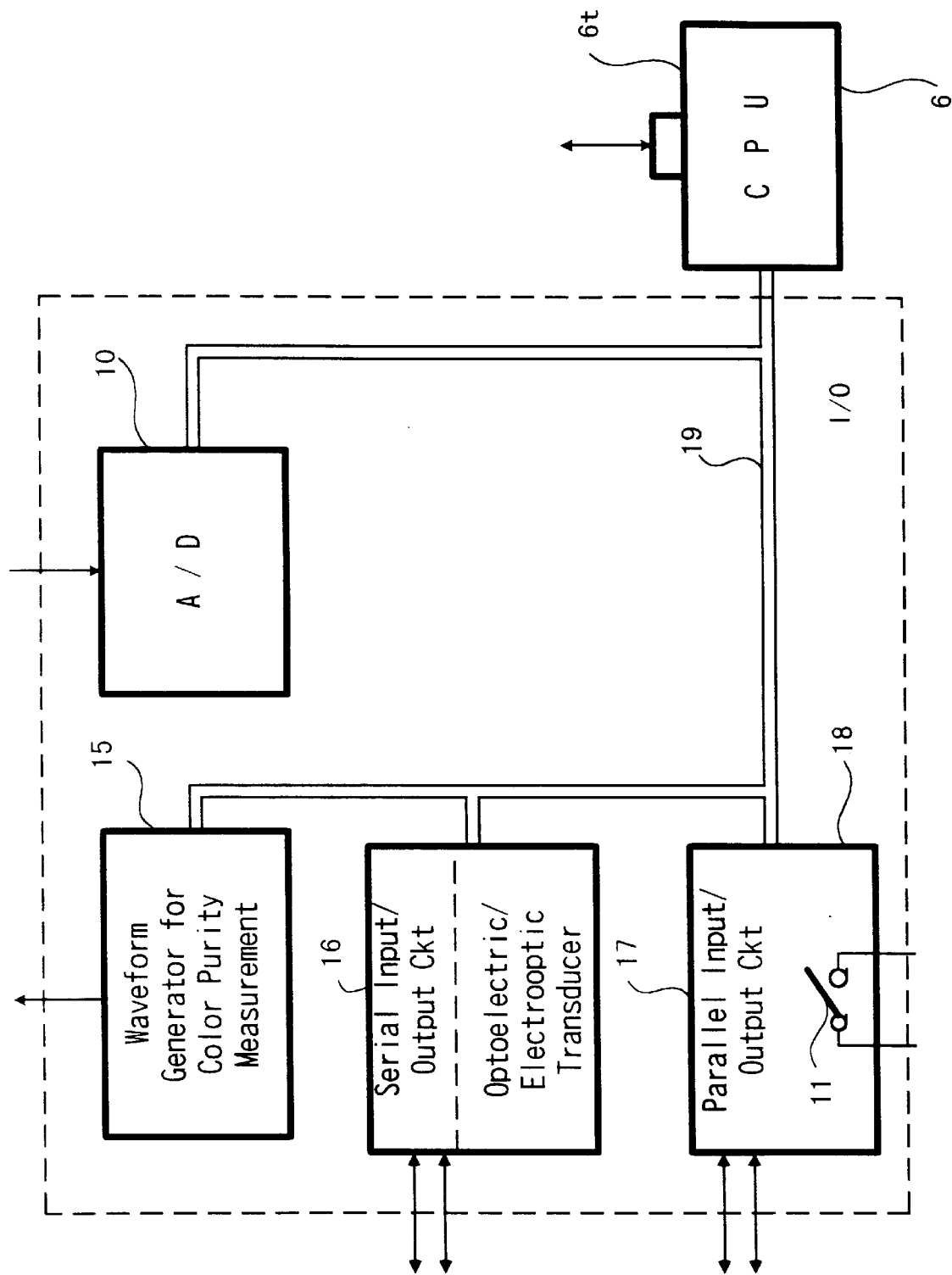
FIG. 5 is a detailed block diagram of an input/output interface circuit of each of the apparatus shown in FIGS. 1 through 3.

As shown in FIG. 5, the input/output interface circuit 9 has a waveform generator 15 for the measurement of color purity. The waveform generator 15 is controlled by the CPU 6 through a bus line 19 to generate a staircase signal, which is supplied to a coil drive amplifier 13 as shown in FIG. 3.

The apparatus shown in FIGS. 3 and 4 is capable of measuring color purity as an image quality factor of the color cathode-ray tube of the color display unit 1 as follows:

(1) For measuring color purity of the color cathode-ray tube, it is necessary to move three electron beams, i.e., three-primary electron beams of red, green, and blue signals, in the color cathode-ray tube with an external magnetic field, and to image luminance changes on the display screen with the color video camera 2. First, the CPU 6 controls the signal generator 12 to generate a signal for display an image having either one of the three primaries, whose color purity is to be measured, on the entire area of the display screen of the color display unit 1. The generated signal is supplied to the color display unit 1.

(2) The external coil 14 mounted on the neck of the color cathode-ray tube as shown in FIG. 3 or the external coils 14A, 14B positioned above and below, respectively, the neck of the color cathode-ray tube as shown in FIG. 4 are supplied with positive and negative staircase signals from the waveform generator 15 through the coil drive amplifier 13.

(3) The color video camera 2 images luminance changes on the display screen of the color display unit 1 depending on the staircase waveform of the supplied signals, and supplies the data of the imaged luminance changes through the image processing circuit 5 and a bus line to the CPU 6. The CPU 6 then processes the luminance data to calculate a measured value of color purity.

The other details of the apparatus shown in FIG. 3 are the same as those of the apparatus shown in FIGS. 1 and 2. Therefore, the apparatus shown in FIG. 3 is also capable of measuring geometric raster distortions, misconvergence, and color temperatures.

In the apparatus shown in FIG. 3, the color sensor 3 and the A/D converter 10 may be dispensed with. The apparatus in which the color sensor 3 and the A/D converter 10 are dispensed with is still capable of measuring geometric raster distortions and misconvergence.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. An apparatus for measuring image qualities of a color display unit, comprising:

an image quality sensor comprising a color video camera for imaging a display screen of the color display unit and a fixed-focus lens combined as an imaging lens with said color video camera;

image quality measuring means for measuring image qualities of the color display unit based on an image signal generated by said color video camera; and image signal generating means for generating an image signal required to measure the image qualities and supplying the image signal to the color display unit;

wherein said color display unit either comprises a color cathode-ray tube or includes a color cathode-ray tube, further comprising magnetic field generating means for imparting an external magnetic field to electron beams in said color cathode-ray tube; and wherein said magnetic field generating means comprises a coil and staircase signal generating means for supplying a staircase current to said coil.

2. An apparatus according to claim 1, further comprising color temperature measuring means for measuring a color temperature of the display screen of the color display unit.

3. An apparatus for measuring image qualities of a color display unit, comprising:

an image quality sensor comprising a color video camera for imaging a display screen of the color display unit and a fixed-focus lens combined as an imaging lens with said color video camera;

image quality measuring means for measuring image qualities of the color display unit based on an image signal generated by said color video camera; and image signal generating means for generating an image signal required to measure the image qualities and supplying the image signal to the color display unit;

wherein said image quality measuring means comprises means for measuring geometric raster distortions of the color display unit with a green signal generated by said color video camera.

4. An apparatus for measuring image qualities of a color display unit, comprising:

an image quality sensor comprising a color video camera for imaging a display screen of the color display unit and a fixed-focus lens combined as an imaging lens with said color video camera;

image quality measuring means for measuring image qualities of the color display unit based on an image signal generated by said color video camera;

image signal generating means for generating an image signal required to measure the image qualities and supplying the image signal to the color display unit; and canceling means for canceling crosstalk components from three-primary signals generated by said color video camera;

said image quality measuring means comprising means for measuring misconvergence of said color display unit after the crosstalk components are canceled from the three-primary signals by said canceling means.

5. A method of measuring image qualities of a color display unit, wherein said color display unit either comprises a color cathode-ray tube or includes a color cathode-ray tube, comprising the steps of:

supplying an image signal required to measure the image qualities of the color display unit;

imaging a display screen of the color display unit with a color video camera of an image quality sensor which has a fixed-focus lens combined as an imaging lens with said color video camera;

measuring image qualities of the color display unit based on an image signal generated by said color video;

imparting an external magnetic field to electron beams in said color cathode-ray tube to move the electron beams; and passing a staircase current to a coil to generate said external magnetic field.

6. A method according to claim 5, further comprising the step of measuring a color temperature of the display screen of the color display unit with color temperature measuring means.

7. A method of measuring image qualities of a color display unit, comprising the step of:

supplying an image signal required to measure the image qualities of the color display unit;

imaging a display screen of the color display unit with a color video camera of an image quality sensor which has a fixed-focus lens combined as an imaging lens with said color video camera;

measuring image qualities of the color display unit based on an image signal generated by said color video; and measuring geometric raster distortions of the color display unit with a green signal generated by said color video camera.

8. A method of measuring image qualities of a color display unit, comprising the steps of:

supplying an image signal required to measure the image qualities of the color display unit;

imaging a display screen of the color display unit with a color video camera of an image quality sensor which has a fixed-focus lens combined as an imaging lens with said color video camera;

measuring image qualities of the color display unit based on an image signal generated by said color video;

canceling crosstalk components from three-primary signals generated by said color video camera; and measuring misconvergence of said color display unit after the crosstalk components are canceled from the three-primary signals by said canceling means.

* * * * *